(12) United States Patent
Buecker et al.

(10) Patent No.: US 8,006,478 B2
(45) Date of Patent: *Aug. 30, 2011

(54) POWER PLANT AND OPERATING METHOD

(75) Inventors: Dominikus Buecker, Munich (DE);
Timothy Griffin, Ennetbaden (CH);
Armin Schimkat, Weinheim (DE)

(73) Assignee: ALSTOM Technology Ltd., Baden (CH)

( * ) Notice: Subject to any disclaimer, the term of this patent is extended or adjusted under 35 U.S.C. 154(b) by 53 days.

This patent is subject to a terminal disclaimer.

(21) Appl. No.: 12/617,814

(22) Filed: Nov. 13, 2009

(65) Prior Publication Data

US 2010/0071380 A1    Mar. 25, 2010

Related U.S. Application Data

(62) Division of application No. 11/235,255, filed on Sep. 27, 2005, now Pat. No. 7,669,403.

(30) Foreign Application Priority Data

Sep. 29, 2004    (DE) .................. 10 2004 047 807

(51) Int. Cl.
*F02G 1/00* (2006.01)
*F02B 43/00* (2006.01)
*B01D 59/12* (2006.01)

(52) U.S. Cl. .............. 60/39.182; 60/39.12; 95/54

(58) Field of Classification Search .............. 60/39.17, 60/39.182, 39.12, 39.53; 96/4, 130, 138; 95/54

See application file for complete search history.

(56) References Cited

U.S. PATENT DOCUMENTS

| | | | |
|---|---|---|---|
| 4,566,267 A | 1/1986 | Mueller et al. |
| 4,974,412 A | 12/1990 | Schneider |
| 5,852,925 A | 12/1998 | Prasad et al. |
| 5,935,298 A | 8/1999 | Prasad et al. |
| 5,950,434 A | 9/1999 | Hums et al. |
| 5,964,922 A | 10/1999 | Keskar et al. |

FOREIGN PATENT DOCUMENTS

| | | |
|---|---|---|
| EP | 0658366 | 6/1995 |
| EP | 0658367 | 6/1995 |
| WO | WO03/027062 | 4/2003 |
| WO | WO2004/042200 | 5/2004 |

OTHER PUBLICATIONS

Search Report for German Patent App. No. 10 2004 047 807.4 (Sep. 22, 2005).

*Primary Examiner* — Ehud Gartenberg
*Assistant Examiner* — Gerald Sung
(74) *Attorney, Agent, or Firm* — Cermak Nakajima LLP; Adam J. Cermak

(57) ABSTRACT

A method for operating a power plant (2), which includes at least one compressor (3), at least one turbine (4), and a burner arrangement (5), involves, to enhance the power plant (2), feeding a combustion exhaust gas from a pre-burner (8) of the burner arrangement (5) to an oxygen-removal device (11), which removes gas of the oxygen from the combustion exhaust gas in which it is contained.

19 Claims, 3 Drawing Sheets

POWER PLANT AND OPERATING METHOD

This application is a Divisional of, and claims priority under 35 U.S.C. §120 to, U.S. application Ser. No. 11/235,255 filed Sep. 27, 2005 now U.S. Pat. No. 7,669,403, and claims priority therethrough under 35 U.S.C. §119 to German patent application no. 10 2004 047 807.4, filed 29 Sep. 2004, the entireties of which are incorporated by reference herein.

BACKGROUND OF THE INVENTION

1. Field of Endeavor

The invention relates to a method for operating a power plant. The invention also relates to a power plant for carrying out this method.

2. Brief Description of the Related Art

Throughout the world, a significant proportion of power generation is based on combustion reactions in which fossil fuels are burnt. As far as it is possible to predict, this will also continue to be the case in the future. However, firstly the combustion of fossil fuels is irrevocably linked to the production of carbon dioxide. Secondly, the increase in the carbon dioxide concentration in the atmosphere is regarded as being a primary cause of global warming. To allow environmentally friendly use of fossil fuels, there are numerous known measures which can be used to reduce the emissions of pollutants and greenhouse gases. By way of example, greenhouse gas emissions can be reduced by operating power plants more economically through increasing their efficiencies. Furthermore, the use of fuels which have a relatively high hydrogen/carbon ratio leads to reduced emission of greenhouse gases. However, fuels of a high hydrogen/carbon ratio, such as for example crude oil and natural gas, are unavailable or have only restricted availability in some parts of the world, which is attributable to geographic and/or political consideration. By way of example, the USA and China each have extensive coal reserves, making this fuel correspondingly inexpensive. Accordingly, in these regions the generation of power based on the combustion of coal will continue to be of relatively great importance, and consequently measures are required to lower the carbon dioxide emissions in this field.

WO 2004/042200 A1 has disclosed a power plant which includes a compressor, a turbine and a burner arrangement with a pre-burner and an afterburner. There is also an oxygen-removal device, which can remove some of the oxygen contained in the combustion exhaust gases from the pre-burner therefrom. The oxygen removed from the combustion exhaust gas from the pre-burner can be discharged from the oxygen-removal device by means of a sweep gas with the aid of a sweep gas device. Dividing the burner arrangement into a pre-burner and an afterburner, combined with the removal of some of the oxygen gas contained in the combustion exhaust gas from the pre-burner from this exhaust gas, means that in this combustion process, in addition to hot combustion exhaust gases which can be expanded in the turbine, gaseous oxygen is thus additionally produced and can then be utilized in basically any desired way. Arranging the oxygen-removal device between the two burners ensures that the oxygen-removal device can operate at relatively high but not excessively high temperatures, which are provided by means of the combustion exhaust gases from the pre-burner. Then, in the subsequent afterburning, the temperature is increased further, in order to enable a combustion exhaust gas with a particularly high energy content to be fed to the turbine.

In the known power plant, the sweep gas used is a mixture of natural gas and steam. In the known power plant, the oxygen-removal device simultaneously serves as a partial oxidation reactor which converts the natural gas supplied at least into hydrogen and carbon monoxide.

In the known power plant, therefore, the oxygen-removal device is exposed to relatively high thermal stresses, which shorten the service life of the oxygen-removal device.

SUMMARY

One of numerous aspect of the present invention relates to the problem of providing an improved embodiment of a power plant and/or an associated operating method which in particular can reduce the thermal stresses on the oxygen-removal device.

Another aspect of the present invention is based on the general concept of using an inert or at least fuel-free gas as the sweep gas. As a result, the sweep gas does not react with the oxygen and the thermal stresses on the oxygen-removal device remain low, which increases the service life of this device.

It is preferable for the oxygen-removal device to include at least one oxygen transport membrane, which has a depleting side (retentate side) and an enriching side (permeate side). In operation, the combustion exhaust gas from the pre-burner is fed to the depleting side. The oxygen transport membrane then removes oxygen gas from this combustion exhaust gas and provides it on the enriching side through the membrane. Certain embodiments of membranes of this type are known as MCM membranes (Mixed Conducting Membranes). A membrane of this type also operates reliably at temperatures which are high compared to ambient temperature, for example from 800° C. to 1000° C. Examples of membranes of this type can be found, for example, in U.S. Pat. No. 6,786,952 and U.S. Pat. No. 6,503,296.

It is preferable for the pre-burner to be designed as a low-temperature burner, whereas the afterburner is designed as a high-temperature burner. A low-temperature burner of this type operates at temperatures which are lower than 1200° C., preferably in a temperature range from approximately 750° C. to 1000° C. By contrast, a high-temperature burner of this type operates, for example, at temperatures greater than 1000° C., preferably in a temperature range from approximately 1200° C. to 1450° C. In this operating mode, the oxygen-removal device or its oxygen transport membrane operates at the temperature level of the low-temperature burner, allowing optimum oxygen removal results to be achieved. In this case, the thermal stresses on the oxygen-removal device or the membrane are at the same time relatively low, which extends the durability or service life thereof.

According to a particularly advantageous embodiment, it is possible to provide a synthesis gas generator, which generates a synthesis gas containing hydrogen gas from a fuel and oxygen gas together with steam. It is expedient for the oxygen gas removed from the combustion exhaust gas from the pre-burner with the aid of the oxygen-removal device to be used to supply the synthesis gas generator with oxygen gas. Furthermore, the synthesis gas generated by the synthesis gas generator can be fed as fuel gas to the pre-burner and/or the afterburner. With a procedure of this type, therefore, a synthesis gas with a high calorific value which produces relatively low levels of pollutant emissions when burnt can be generated from basically any desired hydrogen-containing fuel, e.g., crude oil, natural gas, coal. It is advantageous in this context that a closed system is used, in which the oxygen provided with the aid of the oxygen-removal device is utilized in the synthesis gas generator to produce the synthesis gas and in which the synthesis gas is used as fuel gas in the burners. The fuel which is used in the synthesis gas generator to produce the synthesis gas is not completely burnt, but rather is used to obtain hydrogen from the steam. For this purpose, partial oxidation takes place in the synthesis gas generator. There is in this case no direct contact between the fuel which is used and the oxygen-removal device, and consequently the latter cannot become soiled by the fuel. In this context, it is particularly advantageous to use a relatively dirty crude fuel containing hydrogen and carbon, such as for example coal or oil sand or wood or domestic garbage, since low-pollutant combustion in the burners can be realized even when using these crude fuels, on account of the use of the synthesis gas.

In another refinement, the synthesis gas which is generated by the synthesis gas generator, before being fed to the burners, can be subjected to various cleaning measures in a cleaning device. In addition to the removal of dust, particles and drops, it is in this context also possible to provide for the removal of any undesirable pollutant gases which may be present from the synthesis gas. By way of example, sulfur and/or hydrogen sulfide can be removed from the synthesis gas in a known way. Furthermore, it is also possible for carbon and carbon oxides to be removed from the synthesis gas. In particular the latter measure allows the synthesis gas to be processed in such a way that ultimately, to carry out the combustion reaction, it contains predominantly hydrogen gas, which burns substantially without releasing pollutants with oxygen gas, in particular in air. This procedure therefore produces a power plant from which the turbine exhaust gases substantially do not contain any pollutants. In particular, there are no carbon oxides present in the turbine exhaust gases.

BRIEF DESCRIPTION OF THE DRAWINGS

Preferred exemplary embodiments of the invention are illustrated in the drawings and explained in more detail in the description which follows, in which identical reference designations denote identical or similar or functionally equivalent components. In the drawings, in each case diagrammatically.

DETAILED DESCRIPTION OF EXEMPLARY EMBODIMENTS

Figure 1:
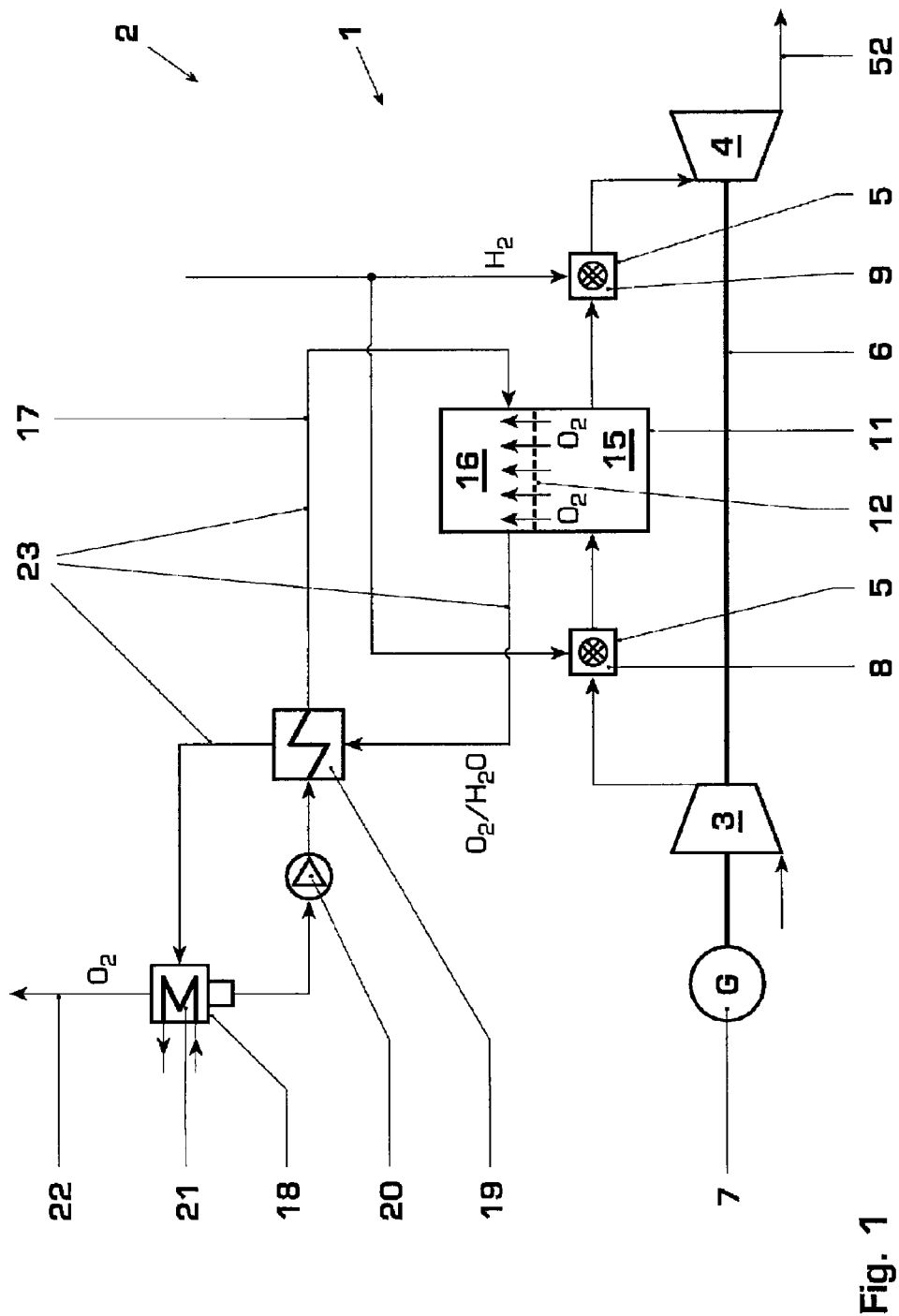
FIG. 1 shows an outline circuit diagram illustration of a power plant in a first embodiment.

FIG. 1 shows a central unit 1 of a power plant 2, which is used in particular for power generation. The central unit 1 of the power plant 2 includes at least one compressor 3, at least one turbine 4, which is expediently configured as a gas turbine, and a burner arrangement 5. The turbine 4, via a drive train 6, drives the compressor 3 and preferably a generator 7.

The burner arrangement 5 includes a pre-burner 8, which is in this case arranged directly downstream of the compressor 3, and an afterburner 9, which is in this case arranged directly upstream of the turbine 4. The two burners 8, 9 are supplied with a gaseous fuel via a fuel supply system 10.

Between the two burners, 8, 9, the central unit 1 has an oxygen-removal device 11, which is configured in such a way that it removes oxygen contained in a gas which is supplied and makes it available on the other side of the oxygen-removal device 11. In the case of the preferred embodiment shown here, the oxygen-removal device 11 has at least one oxygen transport membrane 12, indicated here by a dotted line. A membrane 12 of this type may preferably be configured as an MCM membrane. The membrane 12 has a depleting side 13 and an enriching side 14, and inside the oxygen-removal device 11 separates a depleting space 15 from an enriching space 16. When the oxygen-removal device 11 is operating, the membrane 12 removes some of the oxygen gas from a gas which is present in the depleting space 15 and contains oxygen gas, and transports this oxygen gas through the membrane 12 to the enriching side 14, where the oxygen gas can be taken up with the aid of a sweep gas and discharged from the enriching space 16. The removal operation is indicated by arrows in FIG. 1, these arrows passing through the membrane 12 in the direction of passage. The transport of oxygen gas through the membrane 12 is usually carried out at a relatively high pressure difference between depleting side 13 and enriching side 14. By way of example, the pressure in the depleting space is in a range from approximately 15 to 30 bar, whereas the pressure in the enriching space 16 is approximately in a range from 1 to 5 bar. The driving force for the transport of oxygen through the membrane 12 is the partial pressure difference of the membrane 12.

To enable the oxygen gas to be transported away from the enriching side 14 with the aid of a suitable sweep gas, the central unit 1 has a sweep gas device 17. The sweep gas device 17 includes an oxygen/sweep gas separating device 18, which is expediently configured as a condenser, a heat exchanger 19, which is expediently configured as an evaporator, and a pump 20. The sweep medium used in this case is a liquid, preferably water, which is evaporated to produce the sweep gas. The sweep gas or liquid vapor, in particular steam, enters the enriching space 16 when the power plant 2 is operating, takes up the oxygen gas which has been made available therein and transports it via the heat exchanger 19 to the oxygen/sweep gas separating device 18. In the oxygen/sweep gas separating device 18, the sweep gas/oxygen gas mixture, which has already been precooled in the heat exchanger 19, is cooled further, for which purpose a corresponding cooling circuit 21 is indicated in FIG. 1. This further cooling allows the liquid vapor to condense out, so that what remains is the gaseous oxygen, which can be discharged via an oxygen line 22. By contrast, the liquefied sweep medium is fed to the pump 20 and pumped through the heat exchanger 19. On account of the high temperature of the sweep gas/oxygen gas mixture when it leaves the oxygen-removal device 11, the liquid can be evaporated in the heat exchanger 19, with the result that the sweep gas is once again available as a liquid vapor. In this way, a closed circuit is provided for the sweep medium. In this way, the heat exchanger 19 is arranged in a sweep gas path 23 between the oxygen-removal device 11 and the oxygen/sweep gas separating device 18. At the same time, the condensed liquid is returned to the sweep gas path 23 through the heat exchanger 19 and evaporated at the same time.

It is expedient for the pre-burner 8 to be configured as a low-temperature burner, the operating temperature of which is below 1200° C., expediently in a range from approximately 750° C. to approximately 1000° C. This means that the combustion exhaust gases from the pre-burner 8 are not too hot for the membrane 12, so that the latter on the one hand can operate optimally and on the other hand has a relatively long service life. It is expedient for the afterburner 9 to be configured as a high-temperature burner, the operating temperature of which is greater than 1000° C. and is preferably in a range from approximately 1200° C. to approximately 1450° C. The afterburner 9 therefore generates a combustion exhaust gas which contains a relatively large amount of energy and can be converted in the turbine 4 into work for driving the compressor 3 and the generator 7 as a result of expansion of this exhaust gas.

In this context, it is expedient for the low-temperature burner, i.e., the pre-burner 8, to be configured as a catalytic burner or as a burner which operates with catalytic combustion. In the case of a catalytic burner of this type, it is possible to produce a relatively stable combustion reaction at the low temperatures measured. By contrast, the high-temperature burner or the afterburner 9 operates with homogeneous combustion.

Figure 2:
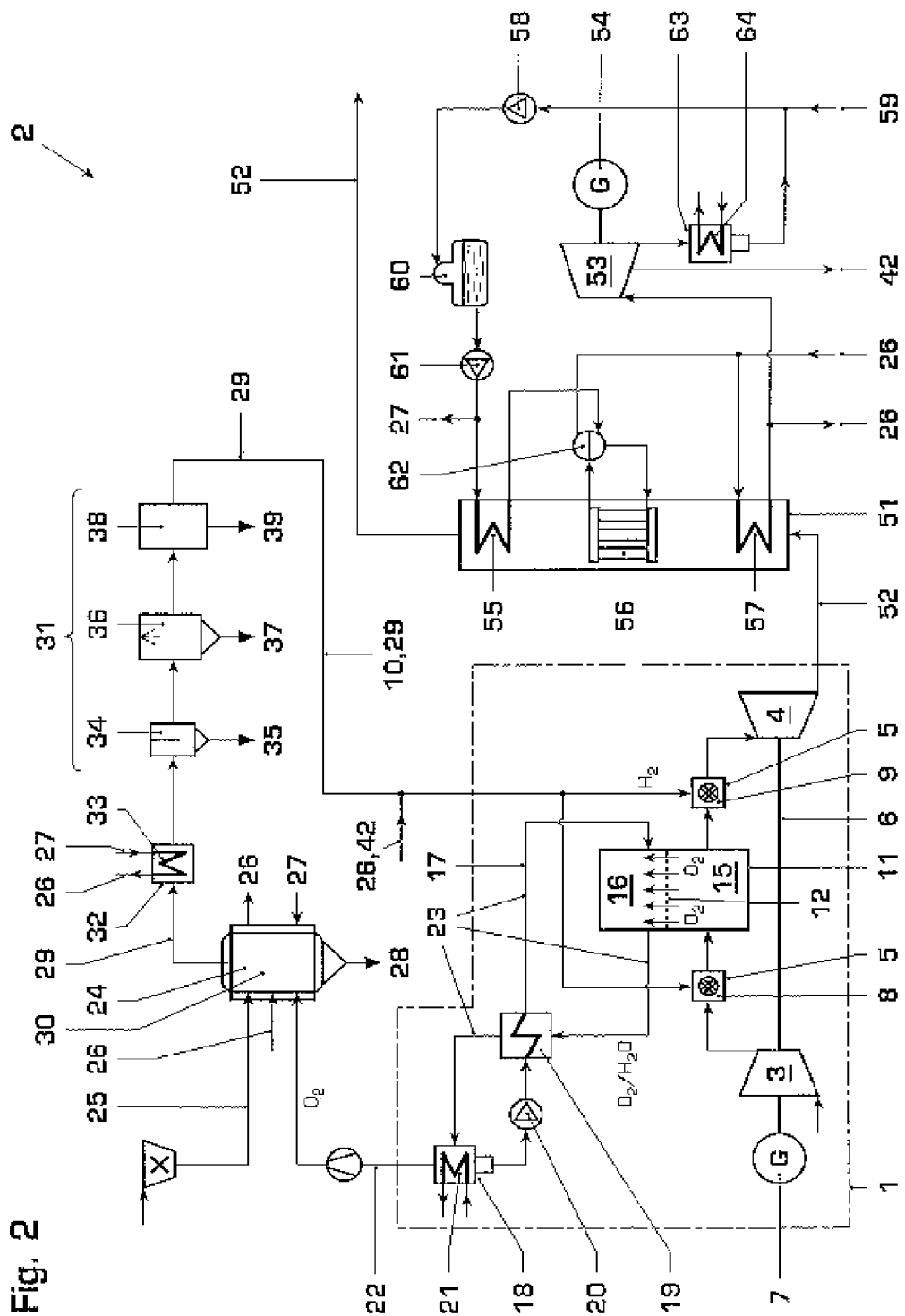
FIG. 2 shows a view as in FIG. 1, but for an extended embodiment.
Figure 3:
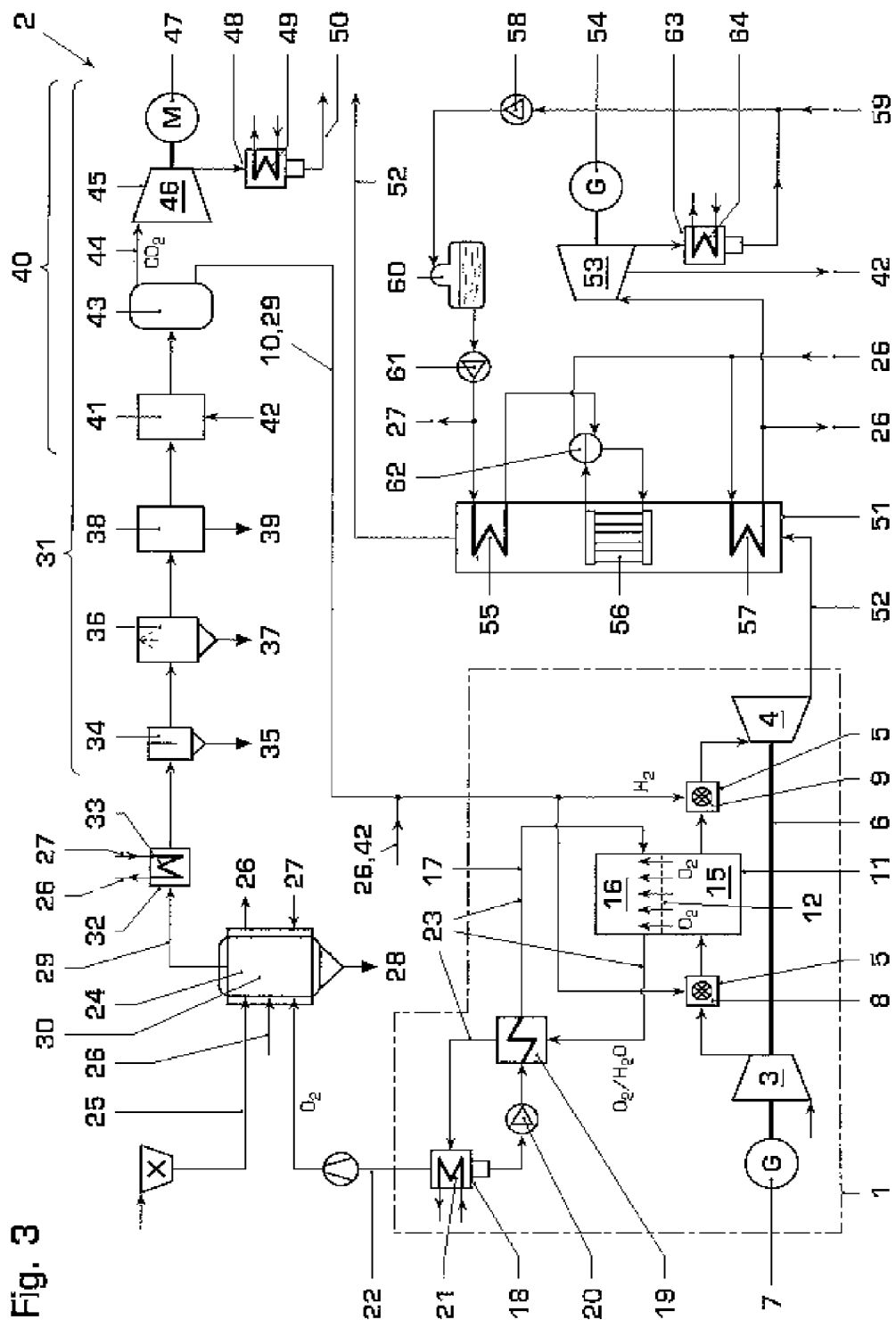
FIG. 3 shows a view as in FIG. 2, but for a further extended embodiment.

As shown in FIGS. 2 and 3, the refinements of the power plant 2 illustrated in those figures once again include the central unit 1, which is indicated by a box shown in dashed lines in FIGS. 2 and 3. The power plant 2 is also equipped with a synthesis gas generator 24, to which the oxygen line 22 coming from the oxygen/sweep gas separating device 18 is connected. Furthermore, a fuel supply device 25, which supplies the synthesis gas generator 24 with a fuel, is connected to the synthesis gas generator 24. This fuel is preferably a crude fuel which contains hydrogen and carbon, in each case in atomic form. Examples of such fuels include crude oil, natural gas, coal, oil sand, oil sludge, wood, industrial waste and domestic garbage. Furthermore, a steam supply 26, which supplies high-pressure steam to the synthesis gas generator 24 and discharges steam that is not required again, is connected to the synthesis gas generator 24. The steam delivers the hydrogen of the synthesis gas production. Furthermore, water for cooling the reactor 24 can be fed to the synthesis gas generator as indicated by an arrow 27.

The synthesis gas generator 24 is configured in such a way that it can generate a synthesis gas containing hydrogen gas from the steam, the fuel and the oxygen gas. At the same time, oxidation products may be produced, which either leave the synthesis gas generator 24 with the synthesis gas or remain therein as slag. The slag can be discharged from the synthesis generator 24 as indicated by an arrow 28.

The synthesis gas generated by the synthesis gas generator 24 is fed via a synthesis gas path 29 to the burners 8, 9, where it can be utilized as fuel gas on account of its hydrogen gas content. In this context, it is important that all of the oxygen gas generated by the central unit 1 is utilized in the synthesis gas generator 25 to generate synthesis gas, and that moreover all of the synthesis gas is utilized as fuel gas in the burner arrangement 5 for carrying out the combustion reactions. In this way, it is possible to provide an externally closed system. In principle, however, it is also possible for the synthesis gas to be removed, for example in the event of overproduction.

According to a particularly advantageous embodiment, the synthesis gas generator 24 includes a gasification device 30. A gasification device of this type can generate the desired synthesis gas containing hydrogen gas from a crude fuel, which contains atomic carbon, in combination with oxygen gas and steam. In the gasification reaction which takes place in the gasification device 30, by way of example, hydrocarbons (fuel; CxHy) are reacted with oxygen ($O_2$) and steam ($H_2O$) to produce carbon monoxide (CO), hydrogen ($H_2$) and residual steam ($H_2O$).

In this context, it is expedient for the synthesis gas to be treated, in particular cleaned, before it enters the burners 8, 9. For this purpose, firstly there is a synthesis gas cleaning device 31, which is represented by a curly bracket and is arranged in the synthesis gas path 29. Secondly, moreover, a synthesis gas cooler 32 may be arranged in the synthesis gas path 29, specifically, for preference, upstream of the synthesis gas cleaning device 31.

The synthesis gas cooler 32 includes a cooling path 33, in which a liquid, in particular water, enters on the inlet side, in turn indicated by 27. On the outlet side, a steam, expediently at high pressure, emerges from the cooling path 33. Accordingly, this high-pressure steam is again denoted by 26 here. The cooling of the synthesis gas on the one hand allows the subsequent cleaning to be simplified. Also, the process heat removed from the synthesis gas can be used for other purposes. In the present case, this process heat generates the high-pressure steam 26 which, for example, can be fed to the synthesis gas generator 24 in order to assist the synthesis reaction there.

Here, by way of example, the synthesis gas cleaning device 31 includes a dust-removal device 34, which operates using inertia forces, for example with a labyrinth-like flow diversion, in order in this way to remove impurities in droplet and/or particle form from the synthesis gas. These impurities include, for example, entrained ash. The deposited residues can be removed from the dust-removal device 34 as indicated by an arrow 35.

Moreover, the synthesis gas cleaning device 31 may include a gas scrubbing device 36, which with the aid of a scrubbing liquid can likewise scrub impurities in droplet and/or particle form out of the synthesis gas. The scrubbing liquid, in particular water, contaminated by impurities can be removed from the gas scrubbing device 36 as indicated by an arrow 37.

Moreover, the synthesis gas cleaning device 31 may include a sulfur-removal device 38, which enables sulfur and sulfur-containing compounds, such as for example hydrogen sulfide, to be removed from the synthesis gas. The separation of sulfur or sulfur compounds is in this case indicated by an arrow 39.

The synthesis gas which has been cleaned in this way, as shown in FIG. 2, can be burnt with relatively low emissions in the burners 8, 9. Moreover, the sulfur removal serves to protect the membrane 12, which—depending on its design—may be sensitive to sulfur.

In accordance with FIG. 3, the exhaust gas cleaning device 31 may in addition or as an alternative be equipped with a carbon-removal device 40, which in this figure is likewise indicated by a curly bracket. Carbon and carbon compounds, preferably carbon oxides, can be removed from the synthesis gas with the aid of a carbon-removal device 40 of this type. It is preferable for a carbon-removal device 40 of this type to include a reactor 41, which oxidizes carbon monoxide entrained in the synthesis gas to form carbon dioxide. For this purpose, the reactor 41 requires, for example, a liquid steam which is at a medium pressure. The supply of this medium-pressure steam is indicated by an arrow 42 in FIG. 3. A Redox reaction or shift reaction, in which steam ($H_2O$) and carbon monoxide (CO) are reacted to form hydrogen ($H_2$) and carbon dioxide ($CO_2$), takes place in the reactor 41. This means that in the reactor 41 the synthesis gas is enriched with hydrogen.

Furthermore, the carbon-removal device 40 may include a carbon dioxide removal device 43, which removes the carbon dioxide from the synthesis gas. The carbon dioxide which has been separated off can be fed, as indicated by an arrow 44, to a liquefaction device 45 of the carbon-removal device 40. In this case, the carbon dioxide gas is compressed in a compressor 46, which is driven by a motor 47, and then in the compressed state is cooled at least down to its dew point in a condenser 48. A corresponding cooling circuit is denoted by 49. The liquefied carbon dioxide can then be discharged as indicated by an arrow 50. The liquefied carbon dioxide can be stored and transported in a space-saving form. In principle, the carbon dioxide can be removed from the synthesis gas in any desired way in the carbon dioxide removal device 43, for example by corresponding cooling, during which the carbon dioxide is liquefied and the hydrogen gas remains in gas form. Alternatively, the carbon dioxide can also be physically adsorbed by a liquid solvent with selective dissolution properties, such as for example Selexol. It is also conceivable to use a membrane which is selectively permeable to carbon dioxide.

The impurities which have been separately removed from the synthesis gas in this way are then present in separate form and accordingly can be disposed of or recycled in an environmentally friendly manner.

The synthesis gas which has been cleaned with the aid of the synthesis gas cleaning device 31, in the embodiment shown in FIG. 3, substantially contains only gaseous hydrogen, which is available at the burners 8, 9 as fuel gas. The combustion reactions which then take place in the burners 8, 9 are substantially devoid of pollutants. In this way, at least the carbon oxides cannot be included in the exhaust gases from the turbine 4.

A common feature of the embodiments shown in FIGS. 2 and 3 is that the actual combustion reaction can be carried out with a defined, sufficiently pure synthesis gas in the burners 8, 9, whereas a crude fuel which can fundamentally be as impure as desired is reacted in the synthesis gas generator 24. This context is particularly important, since on the one hand the service life and correct functioning of the oxygen-removal device 11 are dependent on the composition of the combustion exhaust gases from the pre-burner 8, and on the other hand a clean fuel, which is carbon-free or contains relatively little carbon compared to the hydrogen content, leads to considerably better $CO_2$ emission values.

Another common feature of the embodiments shown in FIGS. 2 and 3 is that a steam generating device 51 is in each case arranged downstream of the turbine 4. The steam generating device 51 is arranged in an exhaust gas path 52 of the turbine 4 and is used to evaporate a liquid, preferably water, with the aid of the turbine exhaust gas which is supplied. In this context, use is made of the residual heat contained in the turbine exhaust gas, with the result that the turbine exhaust gas is cooled at the same time. The steam obtained in this way can be used to supply a steam turbine 53, which drives a generator 54, which may in principle also be the generator 7 driven by the turbine 4.

In the embodiment shown here, the steam generating device 51 includes three heat exchangers, namely a liquid heat exchanger 55, an evaporator 56 and a steam heat exchanger 57. A first pump 58 delivers the correspondingly prepared liquid, in particular water, from a reservoir 59 into a pressure vessel 60. From the pressure vessel 60, a second pump 61 passes the liquid through the liquid heat exchanger 55. The liquid is heated in the process. Liquid can be branched off between the second pump 61 and the liquid heat exchanger 55 to be used for other purposes, for example to cool the synthesis gas generator 24 and/or to cool the synthesis gas in the synthesis gas cooler 32. Accordingly, this liquid branching is likewise denoted by 27.

Downstream of the liquid heat exchanger 55, the preheated liquid is heated further in an external, further heat exchanger 62 using hot steam which comes from the evaporator 56. Then, the liquid passes into the evaporator 56, in which it is evaporated. The hot steam which is generated in the process flows through the external heat exchanger 62 and releases some of its heat to the preheated liquid, which is then fed to the evaporator 56. Downstream of the heat exchanger 62, the steam passes into the steam heat exchanger 57, in which the steam is additionally heated. Then, a high-pressure hot steam is present downstream of the steam heat exchanger 57. This high-pressure steam can be branched off if necessary, in order for example to boost the synthesis process in the synthesis gas reactor 24. Accordingly, the branching-off of the high-pressure steam is likewise denoted by 26 here. Furthermore, it is in principle possible for the high-pressure steam 26 to be admixed with the synthesis gas as inert gas, which in FIGS. 2 and 3 takes place downstream of the synthesis gas cleaning device 31 and is likewise indicated by an arrow. The high-pressure steam 26 which is generated elsewhere in the power plant 2, for example in the synthesis gas cooler 32, or is no longer required, for example at the synthesis gas generator 24, can be returned to the steam circuit of the steam generating device 51 at a suitable location, for example between the steam heat exchanger 57 and the heat exchanger 62. This return of the high-pressure steam is once again indicated by an arrow 26.

The steam which has been expanded in the steam turbine 53 can be liquefied in a condenser 63 with the aid of a corresponding cooling circuit 64. The liquid is then available again on the suction side of the first pump 58. Furthermore, as shown in FIG. 3, it is possible for steam at a medium pressure, i.e. a medium-pressure steam, to be removed at a suitable location of the steam turbine 53, as indicated by an arrow, which is in turn denoted by 42. This medium-pressure steam 42 can be utilized at the reactor 41 to oxidize the carbon monoxide. It is also possible for this medium-pressure steam 42 to be admixed to the synthesis gas instead of the high-pressure steam 36.

The power plant 2 operates as follows:

The compressor 3 compresses an oxidizer gas, in particular air, which contains oxygen gas. The compressed oxidizer gas is burnt under lean conditions, i.e. with an excess of oxygen, in the pre-burner 8. The combustion exhaust gas from the pre-burner 8 is fed to the depleting space 15 of the oxygen-removal device 11. In the oxygen-removal device 11, some of the gaseous residual oxygen contained in the combustion exhaust gas from the pre-burner 8 is transported through the membrane 12 into the enriching space 16. The combustion exhaust gas from the pre-burner 8, which has a reduced oxygen content, is then fed to the afterburner 9, in which further combustion, preferably under lean conditions, takes place.

In the enriching space 16, the oxygen gas is taken up by the sweep gas, with the sweep gas being heated at the same time. The sweep gas/oxygen mixture is cooled again in the heat exchanger 19. The sweep gas, expediently steam, is condensed in the oxygen/cooling gas separating device 18 and returned via the pump 20 through the heat exchanger 19 into the sweep gas path 23, being evaporated at the same time. The oxygen gas which remains is fed to the synthesis gas reactor 24 via the oxygen line 22.

In the synthesis gas reactor 24, a crude fuel, for example coal, is reacted in such a way as to form a synthesis gas containing hydrogen gas. The synthesis gas is cooled in the synthesis gas cooler 32 and impurities are removed in the synthesis gas cleaning device 31.

The purified synthesis gas is then fed to the burners 8, 9 as fuel gas, where, on account of the hydrogen which it contains, it leads to relatively clean combustion reactions.

Since the pre-burner 8 is expediently a low-temperature burner its combustion exhaust gases are correspondingly at relatively lower temperatures. At the same time, this combustion exhaust gas is at a relatively high pressure, namely generally the compressor outlet pressure, which may be in the range between 15 bar and 30 bar. By contrast, the pressure in the sweep gas path is relatively low, expediently in a range from 1 bar to 5 bar. The oxygen transport through the membrane 12 is in this context driven by the prevailing pressure difference and also by a corresponding concentration difference. The concentration difference can be maintained by the increasing amount of oxygen gas on the enriching side 14 being continuously removed with the aid of the sweep gas.

It is expedient for the afterburner 9 to be a high-temperature burner, so that its combustion exhaust gases are correspondingly hot. In the turbine 4, the hot combustion exhaust gases from the afterburner 9 are expanded and cooled as they flow through the steam generating device 51. In the process, liquid is evaporated and can then be expanded in the steam turbine 53.

LIST OF DESIGNATIONS

1 Central unit
2 Power plant
3 Compressor
4 Turbine
5 Burner arrangement
6 Drive train
7 Generator
8 Pre-burner
9 Afterburner
10 Fuel supply
11 Oxygen-removal device
12 Oxygen transport membrane
13 Depleting side of 12
14 Enriching side of 12
15 Depleting space
16 Enriching space
17 Sweep gas device
18 Oxygen/sweep gas separating device
19 Heat exchanger
20 Pump
21 Cooling circuit
22 Oxygen line
23 Sweep gas path
24 Synthesis gas generator
25 Fuel supply
26 High-pressure steam
27 Liquid
28 Slag removal
29 Synthesis gas path
30 Gasification device
31 Sweep gas cleaning device
32 Sweep gas cooler
33 Cooling path
34 Dust-removal device
35 Dust discharge
36 Gas scrubbing device
37 Waste water removal
38 Sulfur-removal device
39 Sulfur removal
40 Carbon-removal device
41 Reactor
42 Medium-pressure steam
43 Carbon dioxide removal device
44 Carbon dioxide line
45 Carbon dioxide liquefaction device
46 Compressor
47 Motor
48 Condenser
49 Cooling circuit
50 Carbon dioxide removal
51 Steam generating device
52 Exhaust gas path of 4
53 Steam turbine
54 Generator
55 Liquid heat exchanger
56 Evaporator
57 Steam heat exchanger
58 First pump
59 Reservoir
60 Pressure vessel
61 Second pump
62 External heat exchanger
63 Condenser
64 Cooling circuit While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

We claim:

1. A method for operating a power plant, which power plant includes at least one compressor, at least one turbine, and at least one burner arrangement including at least one pre-burner and at least one afterburner, the method comprising:
   compressing an oxidizer gas containing oxygen gas in the compressor;
   burning the compressed oxidizer gas under lean conditions and with a fuel gas in at least one pre-burner of the burner arrangement;
   feeding a combustion exhaust gas from the pre-burner to an oxygen-removal device which removes part of the oxygen gas from the combustion exhaust gas in which said oxygen gas part is contained;
   burning the combustion exhaust gas with a reduced oxygen content with a fuel gas downstream of the oxygen-removal device in at least one afterburner of the burner arrangement;
   feeding a combustion exhaust gas from the afterburner to the turbine and expanding said combustion exhaust gas from the afterburner in the turbine;
   discharging the oxygen removed from the combustion exhaust gas from the pre-burner from the oxygen-removal device by a sweep gas, wherein the sweep gas is an inert gas or a fuel-free gas;
   providing a steam generating device incorporated in an exhaust gas path of the turbine;
   evaporating a liquid with the aid of a turbine exhaust gas;
   cooling the turbine exhaust gas while evaporating said liquid;
   applying high pressure with the steam generating device to the steam;
   expanding the high-pressure steam in a steam turbine; and
   removing partially expanded steam from the steam turbine as medium-pressure steam, and admixing said partially expanded steam to a synthesis gas upstream of the at least one pre-burner, upstream of the at least one afterburner, or upstream of both.

2. The method as claimed in claim 1, wherein the oxygen-removal device comprises at least one oxygen transport membrane which has a depleting side and an enriching side, and further comprising:
   feeding the combustion exhaust gas from the pre-burner to the depleting side; and
   removing oxygen gas from the combustion exhaust gas with the membrane and providing said oxygen gas on the enriching side through the membrane.

3. The method as claimed in claim 2, wherein a sweep gas device is connected to the oxygen-removal device and feeds sweep gas to the oxygen-removal device, and further comprising:

taking up and transporting away the oxygen gas provided on the enriching side of the membrane with the sweep gas.

4. The method as claimed in claim 3, wherein an oxygen/sweep gas separating device positioned downstream of the oxygen-removal device is incorporated in a sweep gas path of the sweep gas device, and further comprising:
removing the entrained oxygen gas with the oxygen/sweep gas separating device from the supplied sweep gas.

5. The method as claimed in claim 4, further comprising:
condensing out liquid in the oxygen/sweep gas separating device; and
separating said liquid from the oxygen.

6. The method as claimed in claim 5, comprising:
providing a heat exchanger having one side arranged in the sweep gas path between the oxygen-removal device and the oxygen/sweep gas separating device, and another side which evaporates the condensed liquid and returns it to the sweep gas path.

7. The method as claimed in claim 1, wherein the at least one pre-burner comprises at least one low-temperature burner, and wherein the at least one afterburner comprises at least one high-temperature burner.

8. The method as claimed in claim 7, comprising:
operating the pre-burner in a temperature range from 750° C. to 1000° C.; or
operating the pre-burner in a pressure range from 15 bar to 30 bar; or
operating the afterburner in a temperature range from 1200° C. to 1450° C.; or
operating the afterburner in a pressure range from 1 bar to 5 bar; or combinations thereof.

9. The method as claimed in claim 7, wherein:
the at least one low-temperature burner comprises at least one catalytic burner; or the at least one low-temperature burner operates with catalytic combustion; or both.

10. A power plant useful for power generation comprising:
a compressor configured and arranged for compressing an oxidizer gas containing oxygen gas;
at least one pre-burner configured and arranged for burning the compressed oxidizer gas with a fuel gas under lean conditions;
an oxygen-removal device configured and arranged for removing some of the oxygen gas from the combustion exhaust gas from the pre-burner;
at least one afterburner configured and arranged for burning the combustion exhaust gas with a reduced oxygen content with a fuel gas;
a turbine configured and arranged for expanding the combustion exhaust gas from the afterburner;
a sweep gas device configured and arranged for discharging the oxygen removed from the combustion exhaust gas from the pre-burner from the oxygen-removal device with a sweep gas, wherein the sweep gas is an inert gas or a fuel-free gas;
a turbine exhaust gas path;
a steam generating device incorporated in the turbine exhaust gas path, configured and arranged to evaporate a liquid with a turbine exhaust gas, the turbine exhaust gas being simultaneously cooled;
wherein the steam generating device is configured and arranged to apply a high pressure to the steam;
a steam turbine configured and arranged to expand the high-pressure steam; and
means for removing partially expanded steam from the steam turbine as medium-pressure steam, and for admixing the partially expanded steam to a synthesis gas upstream of the at least one pre-burner, upstream of the at least one afterburner, or upstream of both.

11. The power plant as claimed in claim 10, wherein:
the oxygen-removal device includes at least one oxygen transport membrane which has a depleting side and an enriching side;
the at least one pre-burner is connected to the depleting side so combustion exhaust gases from the pre-burner can be fed to said at least one pre-burner; and
the at least one oxygen transport membrane is configured and arranged to remove oxygen gas from the combustion exhaust gas from the at least one pre-burner by transporting the oxygen from the depleting side through the membrane to the enriching side.

12. The power plant as claimed in claim 11, wherein the sweep gas device is connected to the enriching side of the oxygen-removal device and is configured and arranged to supply the oxygen-removal device with the sweep gas for taking up and transporting away oxygen gas provided on the enriching side of the membrane.

13. The power plant as claimed in claim 12, wherein the sweep gas device includes a sweep gas path, and further comprising:
an oxygen/sweep gas separating device positioned downstream of the oxygen-removal device and incorporated in the sweep gas path of the sweep gas device, the oxygen/sweep gas separating device configured and arranged to remove entrained oxygen gas from supplied sweep gas.

14. The power plant as claimed in claim 13, wherein the oxygen/sweep gas separating device is configured and arranged to separate liquid from oxygen by condensing.

15. The power plant as claimed in claim 14, further comprising:
a heat exchanger including one side arranged in the sweep gas path between the oxygen-removal device and the oxygen/sweep gas separating device, and another side configured and arranged to evaporate the condensed liquid and return the condensed liquid to the sweep gas path.

16. The power plant as claimed in claim 10, wherein the at least one pre-burner is configured and arranged as at least one low-temperature burner, and wherein the at least one afterburner is configured and arranged as at least one high-temperature burner.

17. The power plant as claimed in claim 16, wherein the at least one low-temperature burner is configured and arranged as at least one catalytic burner, is configured and arranged to operate with catalytic combustion, or both.

18. The power plant as claimed in claim 10, further comprising:
a burner arrangement including said at least one pre-burner and said at least one afterburner.

19. The power plant as claimed in claim 10, wherein the steam generating device is configured and arranged to evaporate water.

* * * * *